(No Model.)
5 Sheets—Sheet 1.
J. B. SMITH.
MACHINE FOR MAKING TELEGRAPH INSULATOR PINS.
No. 278,619. Patented May 29, 1883.
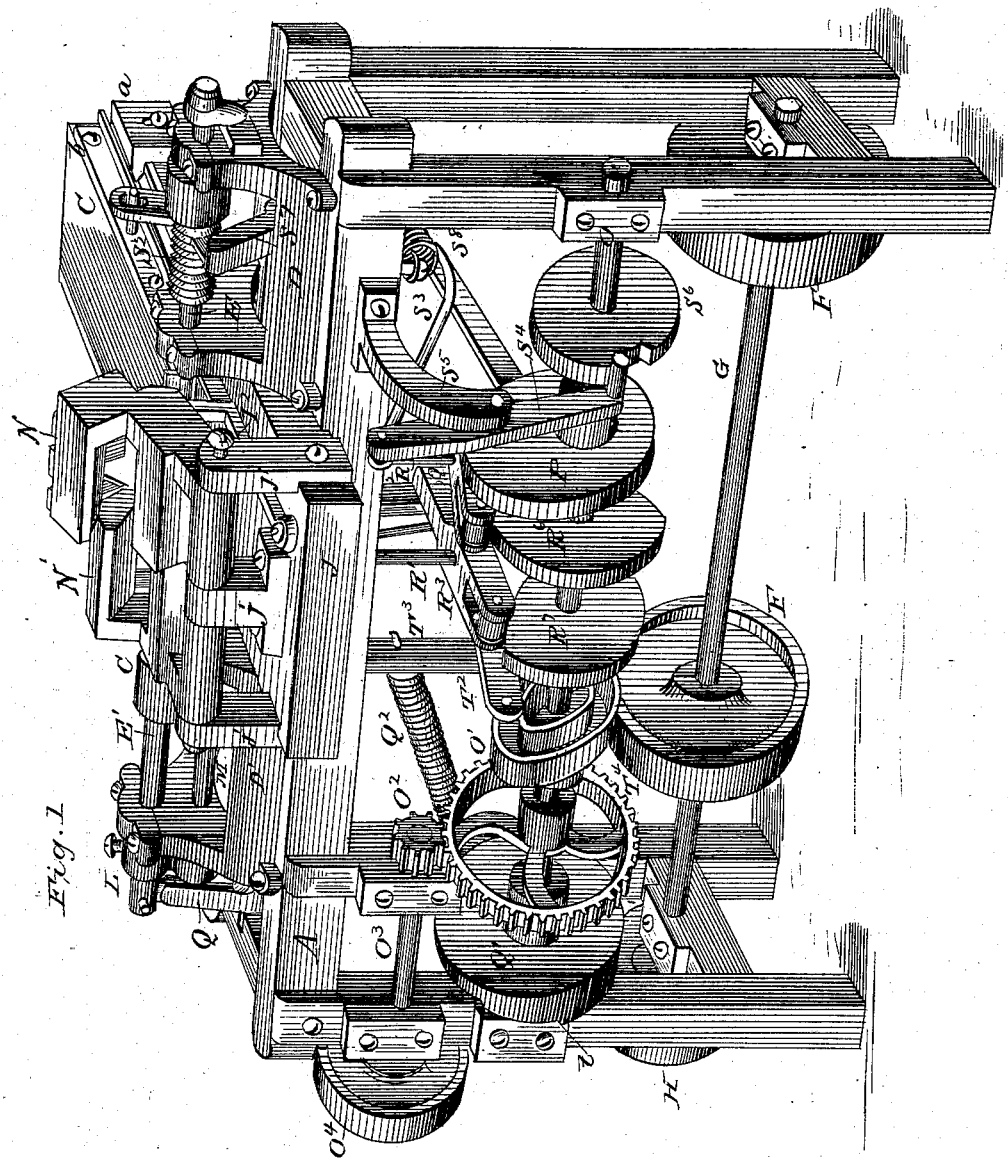
WITNESSES:
INVENTOR:
ATTORNEYS.

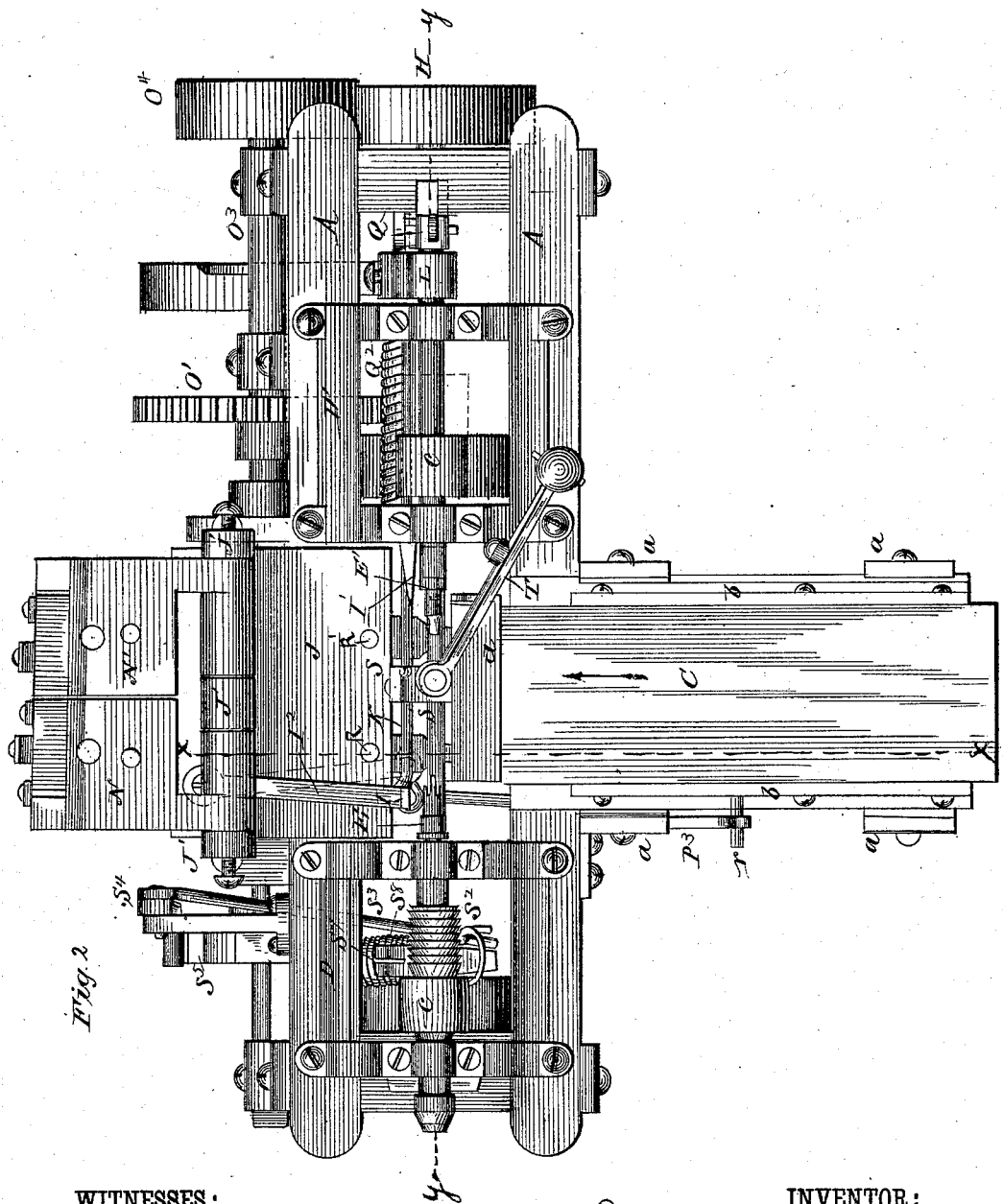

(No Model.)  J. B. SMITH.  5 Sheets—Sheet 3.
MACHINE FOR MAKING TELEGRAPH INSULATOR PINS.
No. 278,619.  Patented May 29, 1883.
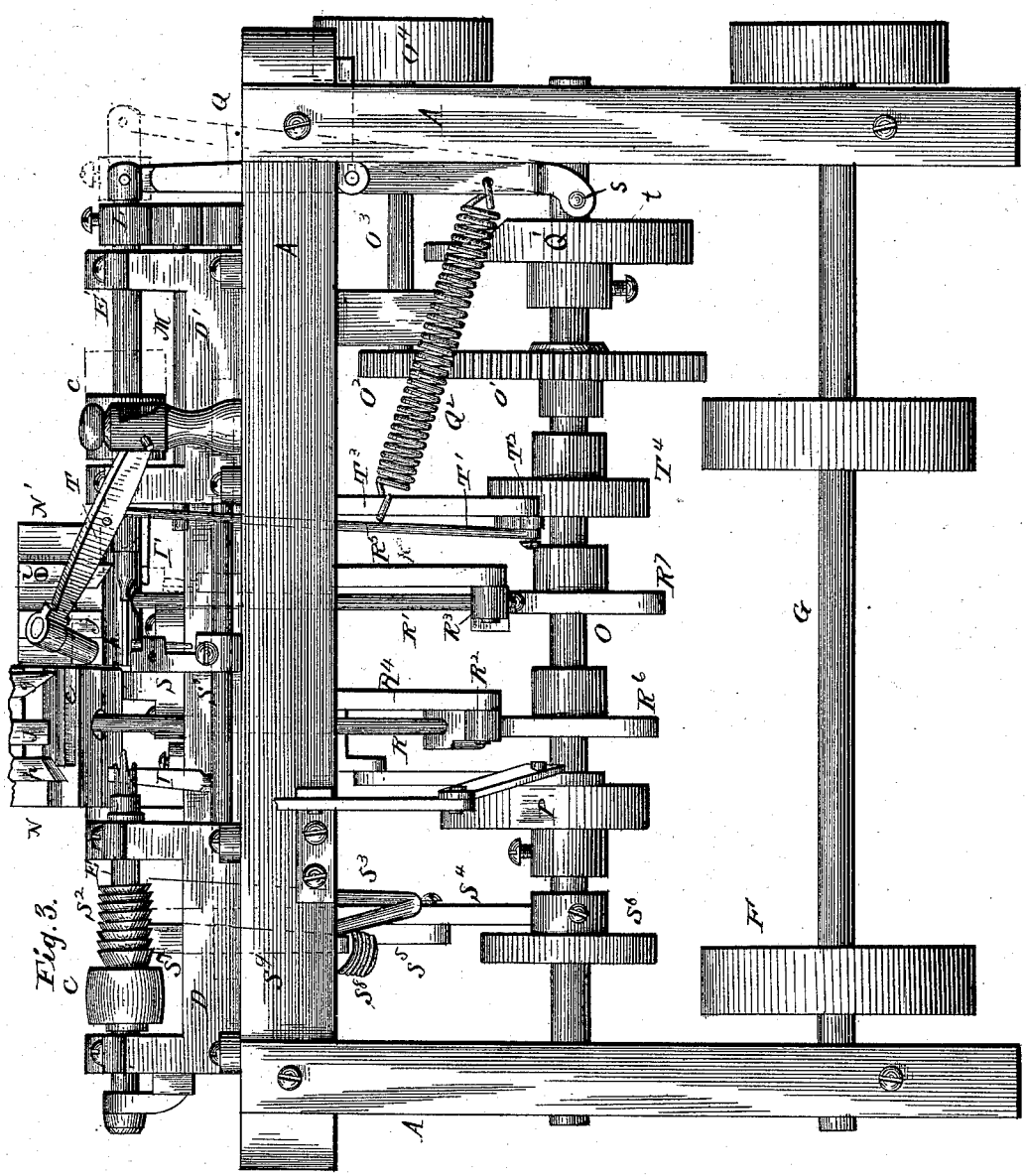
WITNESSES:  INVENTOR:
Fred. G. Dieterich  Jno. B. Smith
  BY
  ATTORNEYS.

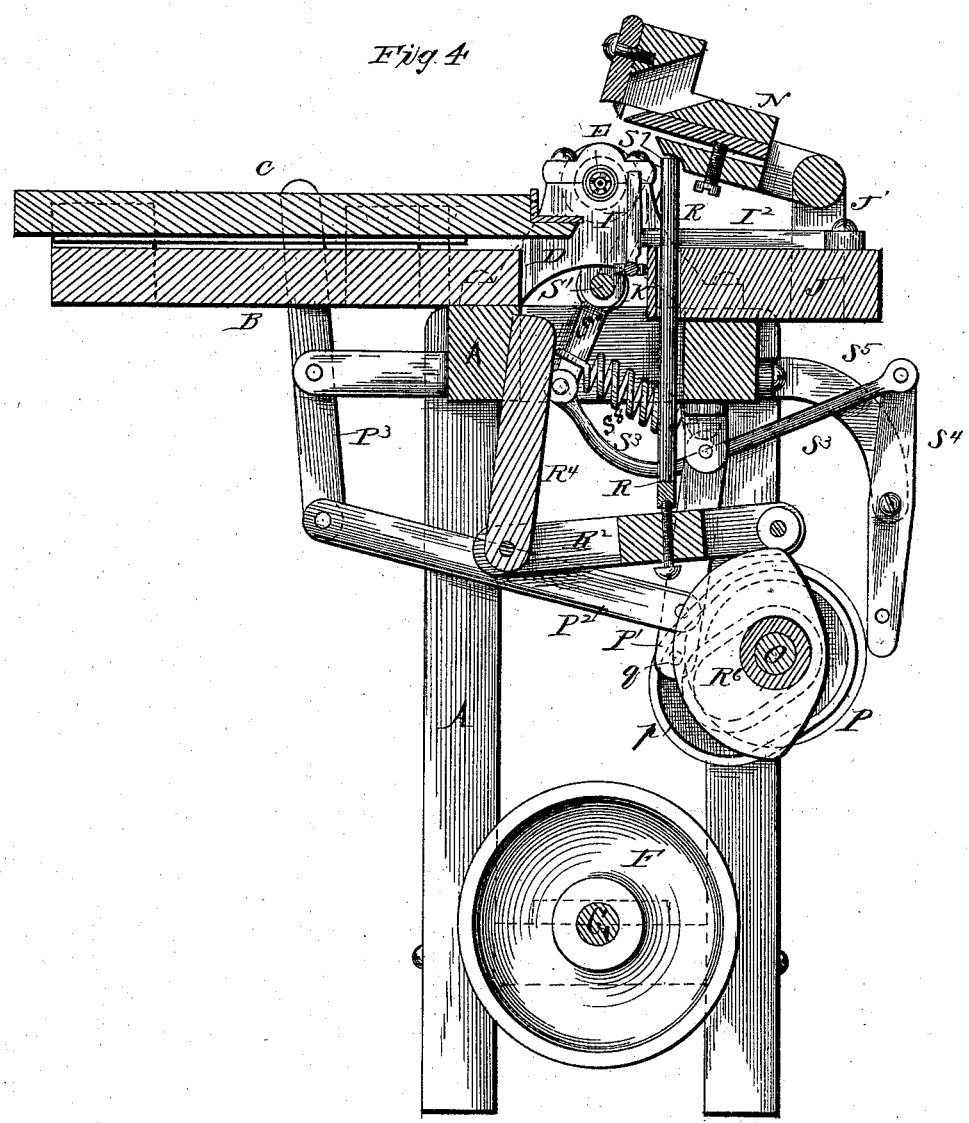

(No Model.) 5 Sheets—Sheet 5.
J. B. SMITH.
MACHINE FOR MAKING TELEGRAPH INSULATOR PINS.
No. 278,619. Patented May 29, 1883.
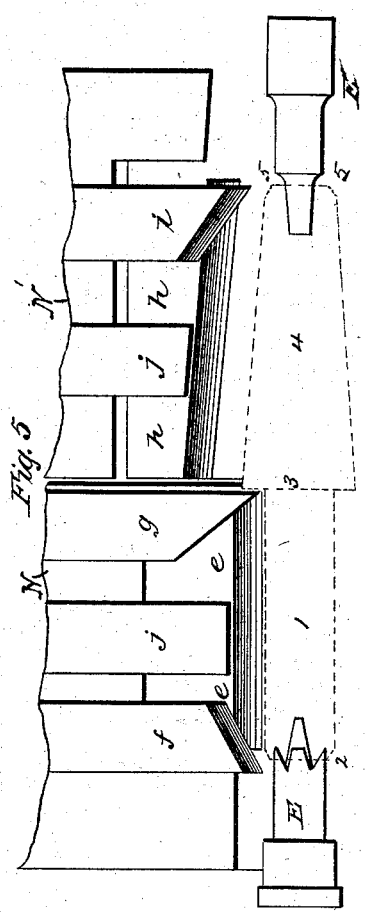
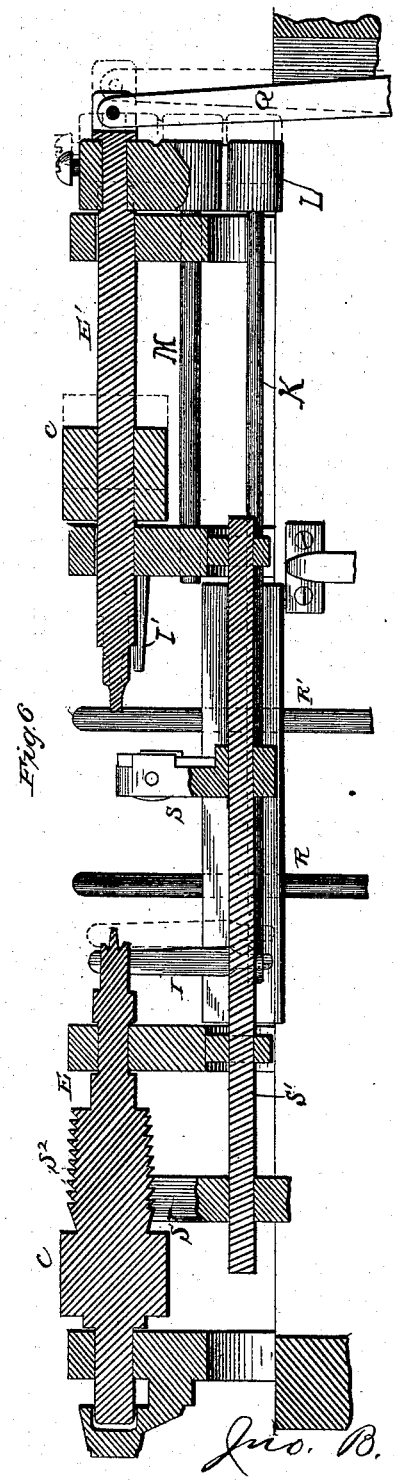
WITNESSES: INVENTOR.
ATTORNEYS.

UNITED STATES PATENT OFFICE.

JOHN B. SMITH, OF SUNAPEE, ASSIGNOR TO CHARLES N. FREEMAN AND DAVID W. O'NEIL, OF CLAREMONT, NEW HAMPSHIRE.

MACHINE FOR MAKING TELEGRAPH-INSULATOR PINS.

SPECIFICATION forming part of Letters Patent No. 278,619, dated May 29, 1883.

Application filed September 2, 1882. (No model.)

*To all whom it may concern:*

Be it known that I, JOHN B. SMITH, of Sunapee, in the county of Sullivan and State of New Hampshire, have invented a new and Improved Machine for Making Telegraph-Insulator Pins; and I do hereby declare that the following is a full, clear, and exact description of the same, reference being had to the accompanying drawings, forming part of this specification, in which—

Figure 1 is a perspective view from the rear of the machine. Fig. 2 is a plan view. Fig. 3 is a front elevation. Fig. 4 is a vertical cross-section through the line $x\ x$ of Fig. 2, looking from right to left, and showing the cutter-holders elevated. Fig. 5 is an enlarged fractional view of the cutters, showing the relation of the same for giving form to the pin when being turned. Fig. 6 is an enlarged vertical longitudinal section through the upper part of the machine, the section being taken through line $y\ y$ of Fig. 2, and looking for the view in the direction of the arrow.

My invention relates to a machine for making pins for holding telegraph-insulators. These pins have one plain cylindrical end, a conical or tapered form for the other end, the base portion of the cone being larger in diameter than the plain cylindrical portion, so as to form a shoulder, while the smaller tapered end is screw-threaded to permit the insulator-socket to be screwed thereon.

My invention is designed to completely turn such form of pin out of a blank; and to this end it consists in the peculiar construction and arrangement of parts whereby the blank is fed to a pair of revolving mandrels, which seize and rotate the blank, while a pair of movable cutter-holders are alternately brought into range of engagement with the blank, after which the screw-thread is cut thereon, the mandrels separate, and a hammer knocks the finished pin loose and out of the way of the next blank, as will be hereinafter more fully described.

In the drawings, A represents the main frame of the machine, about the middle of which is arranged a table, B, projecting to one side or offsetting from the frame-work, and having upon its sides slotted guide-clips $a$, fastened to the table by screws passing through their slots, so as to have a vertical adjustment. These clips have inwardly-projecting tongues, that enter grooved metal strips $b$, fastened to the horizontal sliding table C, which latter has a reciprocating movement transversely to the main frame, and on its inner end carries an angular seat or holder, $d$, for the blank. On each side of this sliding table there is mounted upon the top of the main frame the metallic journal-frames D D′ for the two horizontal rotating mandrels E E′. These mandrels have at their inner ends gripping devices for the blank, so as to hold the latter firmly while it is being turned. These mandrels are provided each with a driving-pulley, $c$, which are to be connected by belts with the larger pulleys, F F, on the main shaft G in the lower part of the frame-work, and which is provided at its end with a pulley, H, to which power is communicated from any suitable source. One of the mandrels, E, has simply a rotary motion, while the other has both a rotary and a longitudinally-reciprocating motion.

I I′ are two stops which limit the inward movement of the blank as it is carried forward by the feed-table. These stops are struck by the blank just as the latter passes into line with the grippers of the mandrels, so that it may be seized between the mandrels. The vertical one of these stops, I, is movable—*i. e.*, it passes out beyond the gripping end of mandrel E to stop the blank in proper alignment, and then immediately retires behind the point of the mandrel, so as to be out of the way of the cutter-holders. This movement of the stop I is simultaneous with the forward movement of the mandrel E′, and for controlling said stop in its movement it is formed with a shank, I², that is pivoted upon a table, J, upon the opposite side of the main frame from the feed-table, and its vertical portion I is connected with a rod, K, (see Fig. 6,) that is attached to a cross-head, L, which connects with the adjustable mandrel E′ and the guide-rod M, and in which cross-head the outer end of this mandrel swivels.

N N′ are the two cutter-holders which form the contour of the pin. These cutter-holders are arranged side by side, and are pivoted or hinged upon a horizontal axis in short standards J′ J′, rising from the back end of table J.

(No Model.)
W. SMITH.
STUMP EXTRACTOR.
No. 278,620. Patented May 29, 1883.
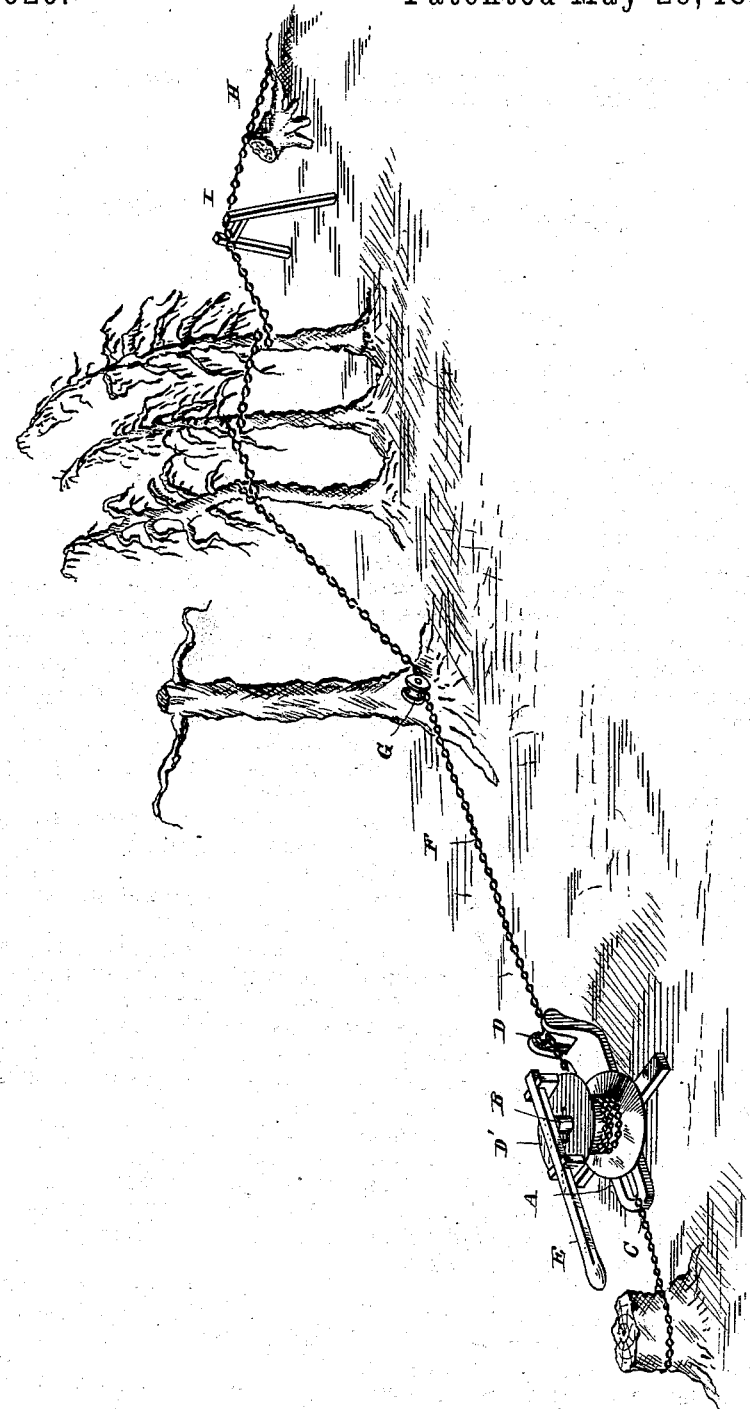
Witnesses.
Edwin L. Yewell.
J. J. McCarthy,
Inventor.
William Smith
E. M. Alexander.
Attorney